US011802607B2

(12) United States Patent
Saeki et al.

(10) Patent No.: US 11,802,607 B2
(45) Date of Patent: Oct. 31, 2023

(54) DAMPER DEVICE

(71) Applicant: AISIN CORPORATION, Kariya (JP)

(72) Inventors: Tomohiro Saeki, Kariya (JP); Yasuhisa Iwasaki, Kariya (JP)

(73) Assignee: AISIN CORPORATION, Kariya (JP)

( * ) Notice: Subject to any disclaimer, the term of this patent is extended or adjusted under 35 U.S.C. 154(b) by 321 days.

(21) Appl. No.: 16/813,076

(22) Filed: Mar. 9, 2020

(65) Prior Publication Data

US 2021/0041006 A1 Feb. 11, 2021

(30) Foreign Application Priority Data

Aug. 9, 2019 (JP) .................................. 2019-148055

(51) Int. Cl.
*F16F 15/123* (2006.01)
*F16F 15/30* (2006.01)

(52) U.S. Cl.
CPC .......... *F16F 15/1234* (2013.01); *F16F 15/30* (2013.01); *F16F 2230/0005* (2013.01); *F16F 2230/0041* (2013.01); *F16F 2232/02* (2013.01); *F16F 2238/026* (2013.01)

(58) Field of Classification Search
CPC .............. F16F 15/1234; F16F 15/30; F16F 2230/0005; F16F 2230/0041; F16F 2232/02; F16F 2238/026
See application file for complete search history.

(56) References Cited

U.S. PATENT DOCUMENTS

| 6,923,725 B2 | 8/2005 | Takeuchi et al. |
| 2003/0087704 A1 | 5/2003 | Takeuchi et al. |
| 2010/0243400 A1 | 9/2010 | Inoshita et al. |

(Continued)

FOREIGN PATENT DOCUMENTS

| JP | S63-045439 U | 3/1988 |
| JP | H06-341459 A | 12/1994 |

(Continued)

OTHER PUBLICATIONS

Office Action (Notice of Reasons for Refusal) dated Jun. 13, 2023, by the Japan Patent Office in corresponding Japanese Patent Application No. 2019-148055 and an English translation of the Office Action. (6 pages).

*Primary Examiner* — Melody M Burch
(74) *Attorney, Agent, or Firm* — BUCHANAN INGERSOLL & ROONEY PC

(57) ABSTRACT

A damper device includes: a first rotating body rotating around a rotation shaft and receiving power transmitted from a flywheel; a second rotating body including a first plate receiving the power transmitted from the first rotating body and a second plate disposed to face the first plate and rotating integrally with the first plate; a third rotating body rotating relative to the second rotating body around the rotation shaft; a fastening body integrating the first and second plates at a position radially spaced apart from a position where the power is transmitted from the first rotating body to the first plate; and an elastic mechanism elastically interconnecting the second and third rotating bodies in a rotation direction. The first plate is provided with a restricting portion restricting relative rotation of the third rotating body beyond a predetermined torsion angle.

13 Claims, 14 Drawing Sheets

(56) References Cited

U.S. PATENT DOCUMENTS

| | | | |
|---|---|---|---|
| 2010/0248846 A1* | 9/2010 | Saeki | F16D 7/025 |
| | | | 464/99 |
| 2012/0252588 A1* | 10/2012 | Saeki | F16F 15/1232 |
| | | | 464/68.91 |
| 2012/0302359 A1* | 11/2012 | Saeki | F16F 15/12366 |
| | | | 464/68.8 |
| 2013/0244800 A1* | 9/2013 | Sakai | F16F 15/1485 |
| | | | 464/68.41 |
| 2016/0305489 A1 | 10/2016 | Yamanaka et al. | |

FOREIGN PATENT DOCUMENTS

| | | |
|---|---|---|
| JP | 2000-130462 A | 5/2000 |
| JP | 2003-222191 A | 8/2003 |
| JP | 5272853 B2 | 8/2013 |
| JP | 6387970 B2 | 9/2018 |

\* cited by examiner

DAMPER DEVICE

CROSS REFERENCE TO RELATED APPLICATIONS

This application is based on and claims priority under 35 U.S.C. § 119 to Japanese Patent Application 2019-148055, filed on Aug. 9, 2019, the entire contents of which are incorporated herein by reference.

TECHNICAL FIELD

The technology disclosed in this application relates to a damper device.

BACKGROUND DISCUSSION

In a vehicle or the like, a damper device is provided on a torque transmission path between a drive source such as an engine and a transmission to absorb vibrations of a torque transmitted from the drive source to the transmission. The damper device is incorporated, for example, in a clutch device.

As a general configuration of the damper device, there has been known a technology to interpose a coil spring between a disk plate as an input member and a hub as an output member, which are rotatable relative to each other, so as to absorb and attenuate vibrations in the torsional direction caused by torque fluctuation using elastic deformation of the coil spring.

As a specific configuration of the damper device, for example, JP 5272853B (Reference 1) discloses a damper device which includes a lining plate (reference numeral 14 in Reference 1), two side plates (corresponding to the above-mentioned disk plate, reference numerals 17 and 18 in Reference 1) as input side components of a damper unit to which power is transmitted from the lining plate, a rivet which integrally secures the lining plate and the two side plates (reference numeral 19 in Reference 1), and a hub (reference numeral 25 in Reference 1), the damper device restricting the relative rotation of the hub by stopper portions (reference numerals 17b and 18b in Reference 1) provided on the two side plates.

In the damper device described in Reference 1, since power transmission from the lining plate to the two side plates is always performed on the rivet, the shear stress is generated in the rivet. For example, when a drive source such as a motor is used in a vehicle or the like, since the shear stress increases due to the influence of the inertial force thereof, additional measures such as increasing the diameter of the rivet need to be taken. Meanwhile, increasing the diameter of the rivet is limited in terms of an arrangement space and costs. Further, in the damper device described in Reference 1, since the rivet and the stopper portions are positioned to overlap each other in the circumferential direction, there is a problem that a part of load applied to the stopper portions propagate to the rivet.

Thus, a need exists for a damper device which is not susceptible to the drawback mentioned above.

SUMMARY

A damper device according to an aspect of this disclosure includes a first rotating body configured to rotate around a rotation shaft and receive power transmitted from a flywheel, a second rotating body including at least a first plate configured to receive the power transmitted from the first rotating body and rotate around the rotation shaft and a second plate disposed to face the first plate and configured to rotate integrally with the first plate around the rotation shaft, a third rotating body configured to rotate relative to the second rotating body around the rotation shaft, a fastening body configured to integrate the first plate and the second plate at a position radially spaced apart from a position where the power is transmitted from the first rotating body to the first plate, and an elastic mechanism configured to elastically interconnect the second rotating body and the third rotating body in a rotation direction, and the first plate is provided with a restricting portion that restricts relative rotation of the third rotating body beyond a predetermined torsion angle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
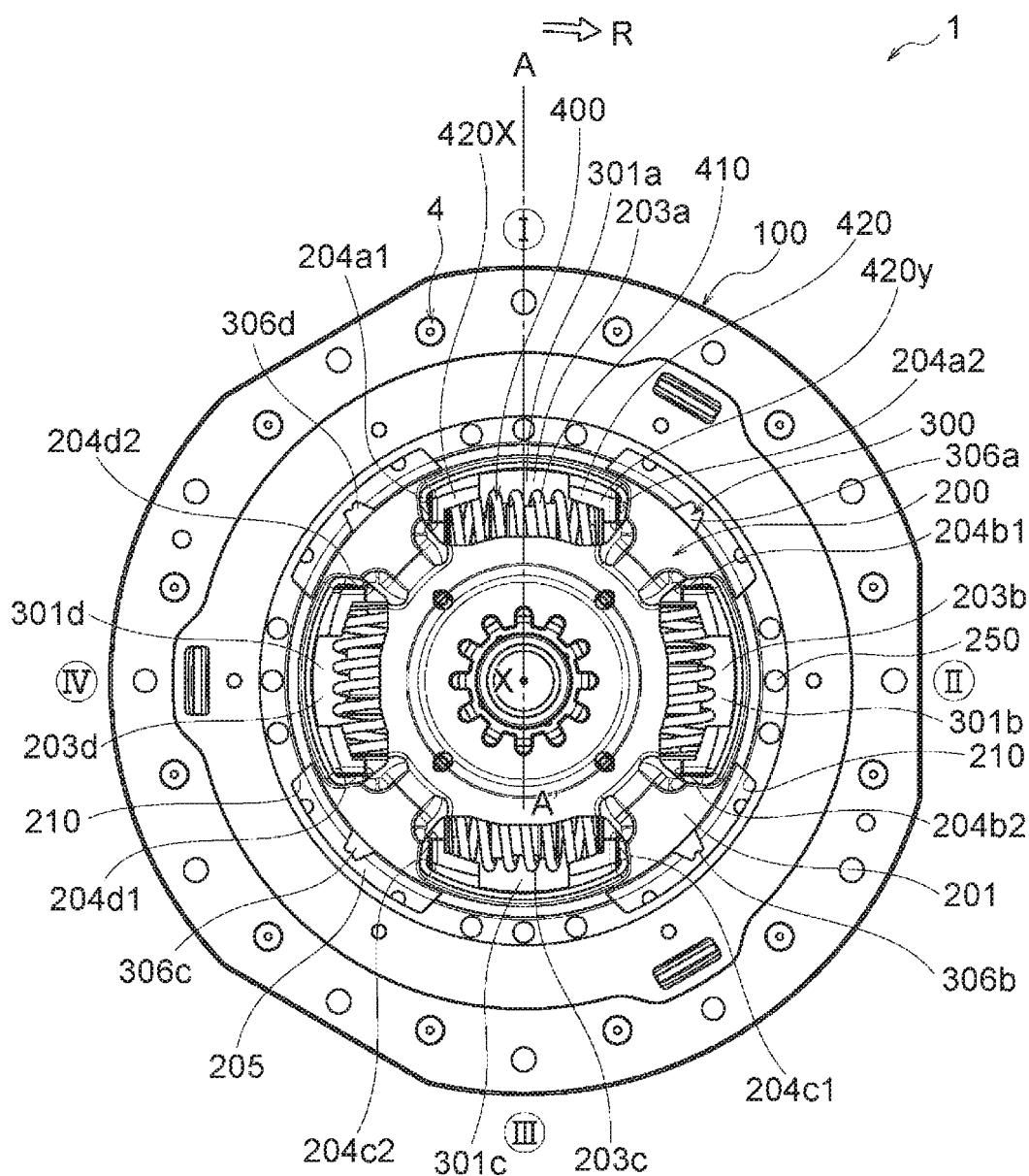
FIG. 1 is a schematic top view schematically illustrating a configuration of a damper device according to a first embodiment.

Hereinafter, various embodiments disclosed here will be described with reference to the accompanying drawings. In addition, in the drawings, the same reference numerals are given to the common components. Further, it should be noted that components illustrated in one drawing may be omitted in other drawings for convenience of description. Furthermore, it should be noted that the accompanying drawings are not necessarily drawn to scale.

1. CONFIGURATION OF DAMPER DEVICE

Figure 2:
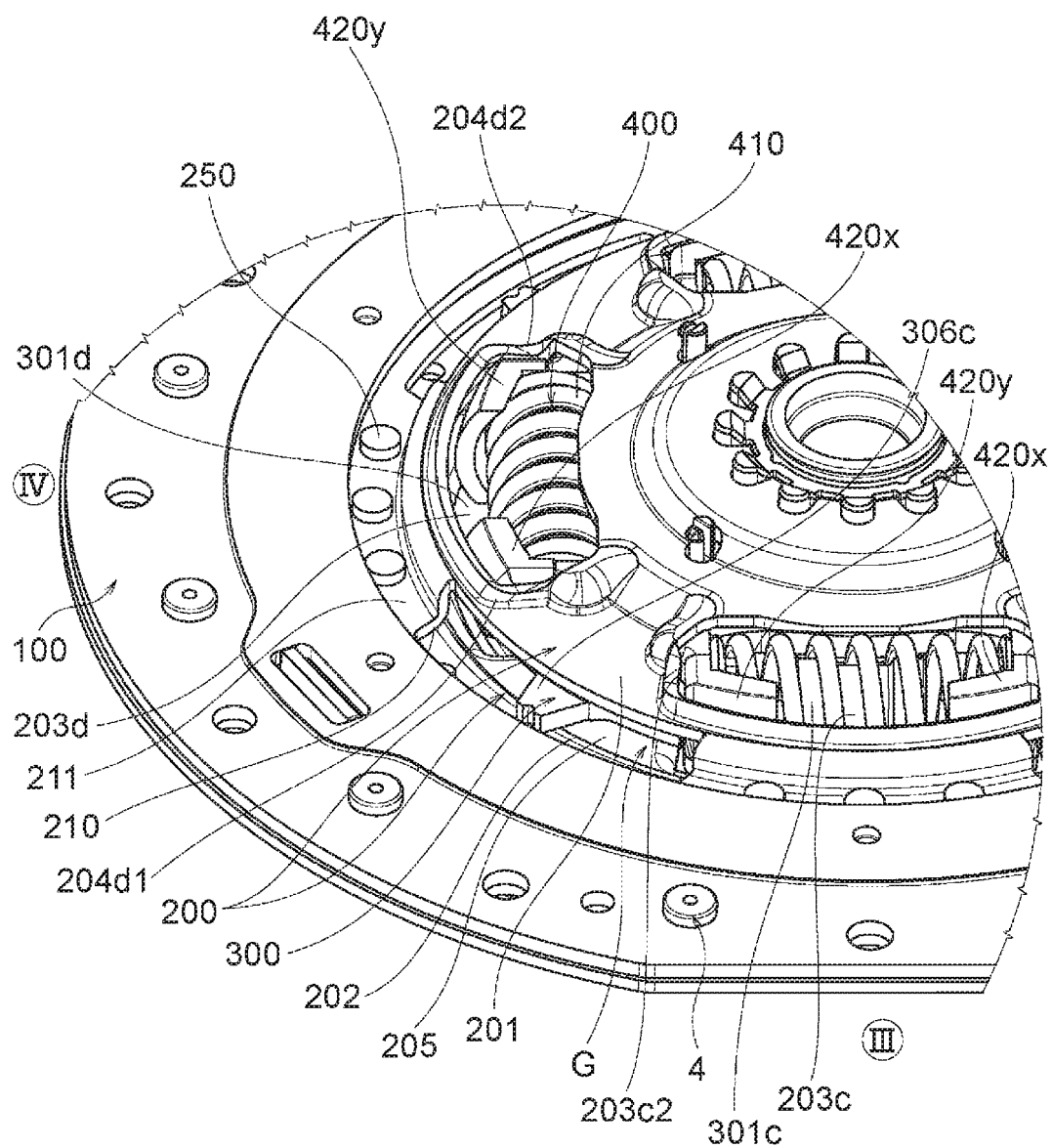
FIG. 2 is a schematic perspective view schematically illustrating a part of the configuration of the damper device illustrated in FIG. 1 in an enlarged manner.
Figure 3:
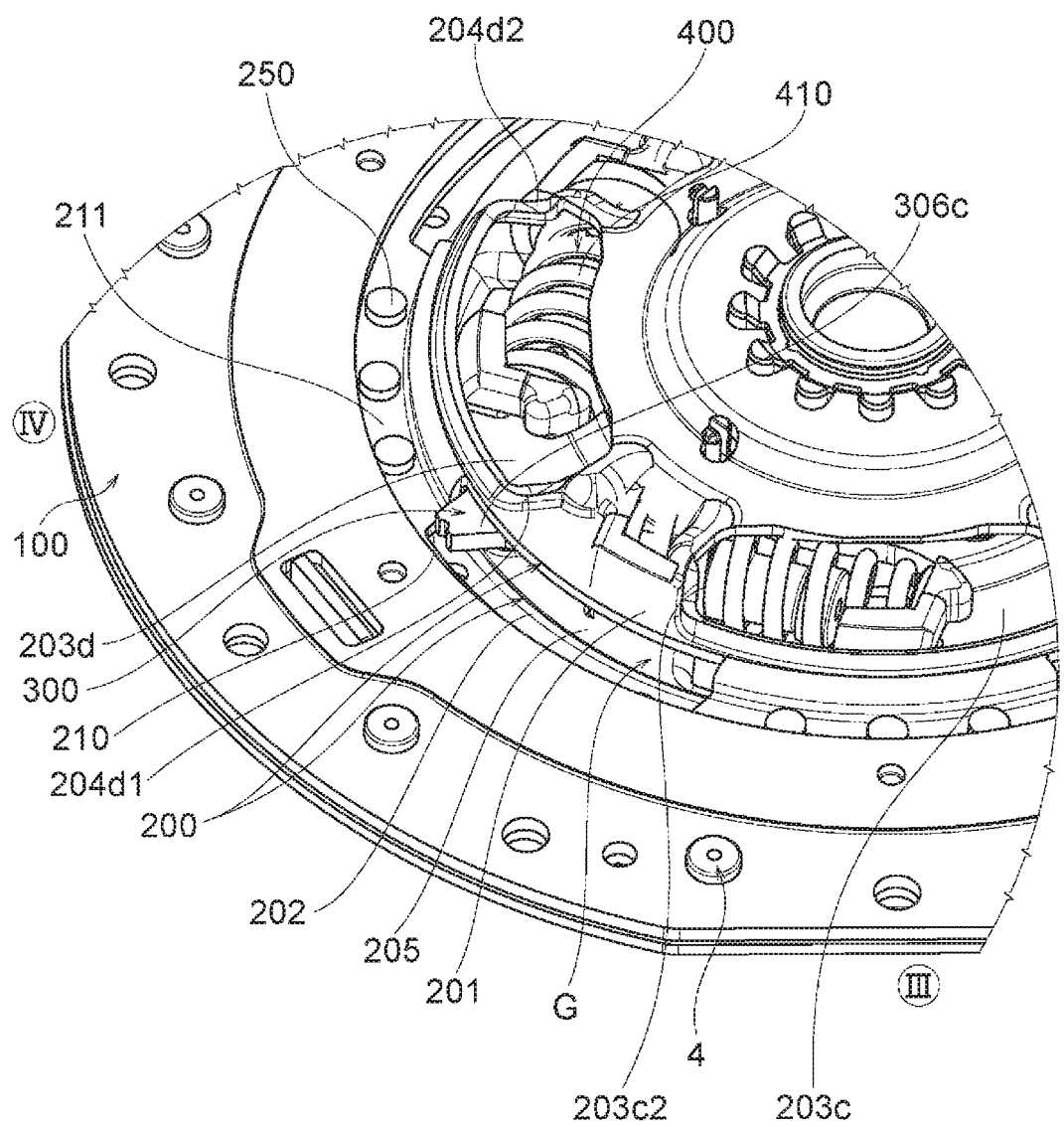
FIG. 3 is a schematic perspective view schematically illustrating a part of the configuration of the damper device illustrated in FIG. 1 in an enlarged manner.
Figure 4:
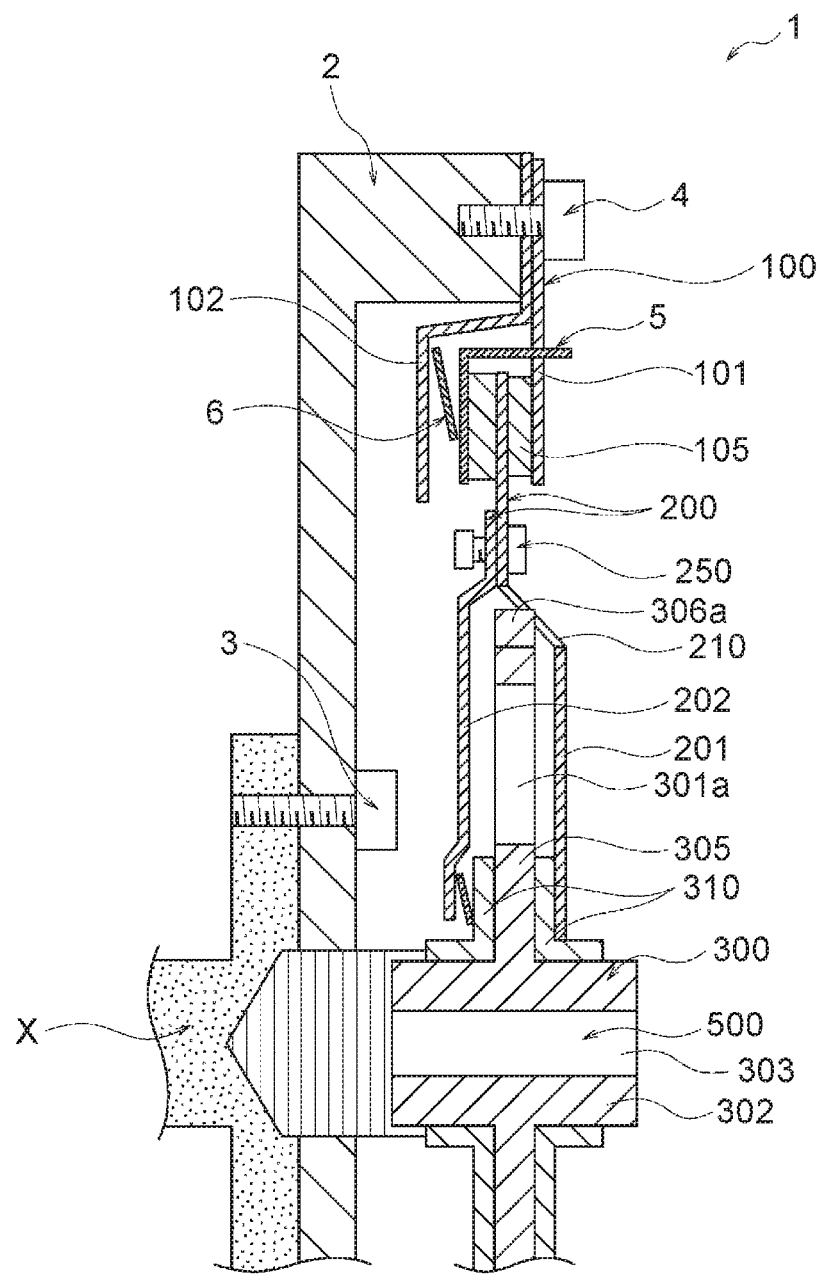
FIG. 4 is a schematic cross-sectional view schematically illustrating the configuration of the damper device illustrated in FIG. 1 as viewed from line A-A' to the side of arrow R.
Figure 5:
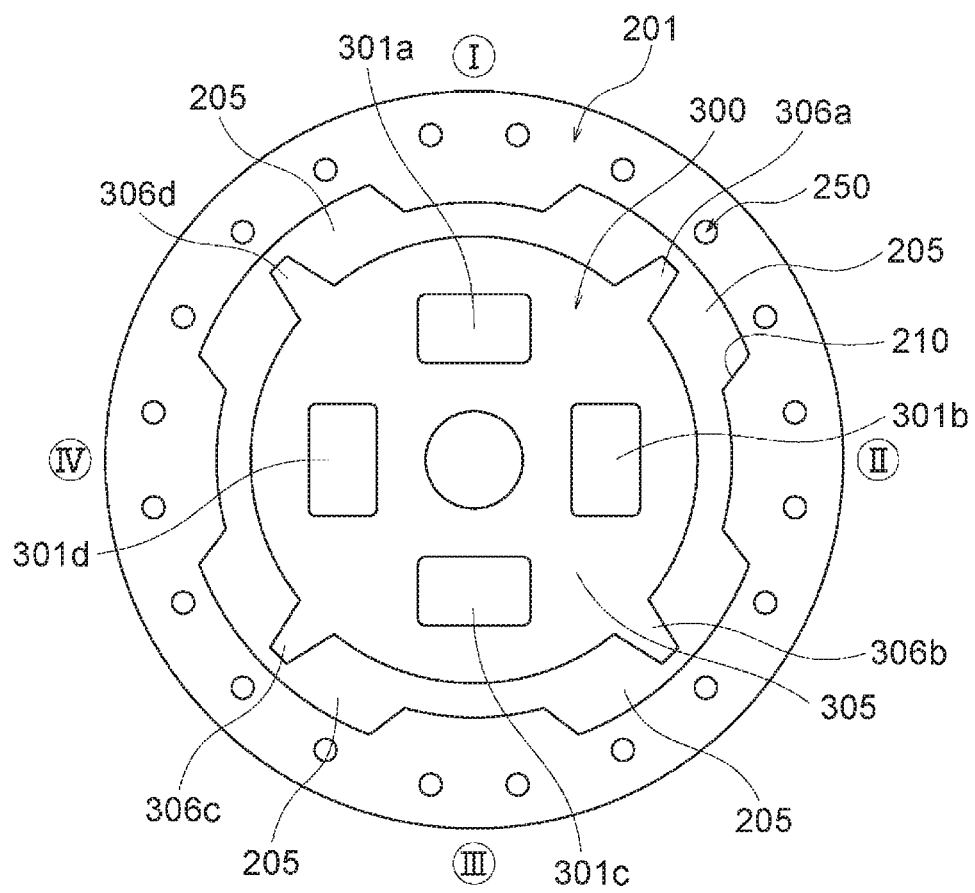
FIG. 5 is a schematic top view further schematically illustrating the configuration of the damper device according to the first embodiment.

An outline of an overall configuration of a damper device according to a first embodiment will be described with reference to FIGS. 1 to 5. FIG. 1 is a schematic top view schematically illustrating a configuration of a damper device 1 according to a first embodiment. FIGS. 2 and 3 are schematic perspective views schematically illustrating a part of the configuration of the damper device 1 illustrated in FIG. 1 in an enlarged manner. FIG. 4 is a schematic cross-sectional view schematically illustrating the configuration of the damper device 1 illustrated in FIG. 1 as viewed from line A-A' to the side of arrow R. FIG. 5 is a schematic top view further schematically illustrating the configuration of the damper device 1 according to the first embodiment. In addition, FIG. 2 illustrates a state where relative rotation does not occur between a disk plate 200 and a hub 300 which are to be described later, and FIG. 3 illustrates a state where the hub 300 rotates relative to the disk plate 200 by a predetermined torsion angle.

The damper device 1 according to the first embodiment is, for example, sandwiched between a flywheel 2 and a pressure plate 5 to transmit a driving force from a drive source (not illustrated) such as an engine or a motor to a transmission.

The damper device 1 absorbs and attenuates torque vibrations. As illustrated in FIGS. 1 to 4, the damper device 1 mainly includes a first rotating body 100 to which power is transmitted from the flywheel 2, the disk plate 200 as a second rotating body, the hub 300 as a third rotating body, and an elastic mechanism 400.

In addition, the flywheel 2 is an annular plate member secured, by a bolt 3, to a rotation shaft X connected to the drive source.

1-1. First Rotating Body 100 and Pressure Plate 5

In the damper device 1, as illustrated in FIG. 4, the first rotating body 100 disposed at the most upstream side on a power transmission path receives the power transmitted from the rotation shaft X connected to the drive source such as an engine or a motor via the flywheel 2. The first rotating body 100 is a substantially annular plate member formed of a metal material, and is secured to the flywheel 2 by a bolt 4. Further, the first rotating body 100 transmits the power to a first plate 201 in the disk plate 200 via a friction material 105 provided between the first rotating body 100 and the disk plate 200 (first plate 201).

In addition, the first rotating body 100 is constituted of a cover plate 101 and a support plate 102. The cover plate 101 transmits the power to the first plate 201 in the disk plate 200 as described above, and the support plate 102 supports a disc spring 6 which presses the pressure plate 5 toward the cover plate 101.

The pressure plate 5 is disposed so as to be sandwiched between the cover plate 101 and the support plate 102 in the first rotating body 100, and one end thereof is secured to the cover plate 101. Further, the pressure plate 5 is pressed toward the support plate 102 by the disc spring 6. Thus, the pressure plate 5 and the first rotating body 100 rotate substantially integrally to transmit the power transmitted from the flywheel 2 to the disk plate 200 as a second rotating body to be described later via the friction material 105.

In addition, as an alternative to providing the friction material 105 described above, a first coating layer (not illustrated) which is made of a compound containing a 3d transition metal may be formed on at least one of the surface of the disk plate 200 facing the cover plate 101 and the surface of the disk plate 200 facing the pressure plate 5, and a second coating layer (not illustrated) which is made of a compound containing a 3d transition metal and has a lower hardness than that of the first coating layer may be formed on at least one of the surface of the cover plate 101 facing the disk plate 200 and the surface of the pressure plate 5 facing the disk plate 200. The first coating layer and the second coating layer substitute for the friction material 105 described above. At the time of initial sliding between the disk plate 200 and the cover plate 101 and/or at the time of initial sliding between the disk plate 200 and the pressure plate 5, the first coating layer digs up the second coating layer, so that the disk plate 200 may slide relative to the cover plate 101 and/or the pressure plate 5.

In this way, by using the first coating layer and the second coating layer instead of the friction material 105, the damper device 1 may be made compact in the axial direction. Further, by using the first coating layer and the second coating layer, as compared with a case where the disk plate 200 and the cover plate 101 undergo direct sliding between metal materials and/or a case where the disk plate 200 and the pressure plate 5 undergo direct sliding between metal materials, the friction coefficient between the two members during initial sliding (initial friction coefficient) may be closer to the friction coefficient between the two members during steady sliding (sliding after the initial sliding) (steady friction coefficient), so that the efficiency of power transmission may be improved.

In addition, the support plate 102 that constitutes the first rotating body 100, the pressure plate 5, and the disc spring 6 may function as a limiter that generates a slip when the damper device 1 may not completely absorb torque fluctuation in the torsional direction (that interrupts the power transmission from the cover plate 101 in the first rotating body 100 to the second rotating body 200)

1-2. Disk Plate 200

In the damper device 1, the disk plate 200 as a second rotating body receives the power from the drive source via the flywheel 2. The disk plate 200 is formed of, for example, a metal material and, as illustrated in FIGS. 1 to 4, is rotatably provided around the rotation shaft X such that the hub 300 to be described later is interposed therebetween. The disk plate 200 includes the first plate 201 and a second plate 202 which are provided as a pair of plate members on opposite sides of the hub 300 in the axial direction to rotate around the rotation shaft X.

As illustrated in FIGS. 1 to 5, the first plate 201 and the second plate 202 are integrally secured by a rivet 250 as a fastening body. Further, the first plate 201 and the second plate 202 are supported by a bush 310 near the radially inner ends thereof. Thus, displacement of the first plate 201 and the second plate 202 in the axial direction is restricted. In addition, as illustrated in FIG. 4, the position where the first plate 201 and the second plate 202 are integrally secured by the rivet 250 is set to the position radially spaced apart from the position where the power is transmitted from the cover plate 101 to the first plate 201 (in FIG. 4, the position radially inwardly spaced apart from the position by a predetermined distance). Accordingly, the first plate 201 receives the power transmitted from the cover plate 101 via the friction material 105 at the radial end thereof, and is integrated with the second plate 202 by the rivet 250 at the radial middle portion thereof. With this configuration, the shear stress and stopper torque generated in the rivet 250 may be reduced.

The first plate 201 and the second plate 202 have an axially bulging shape so that they define, in cooperation with each other, accommodating regions (indicating four accommodating regions in the example illustrated in FIG. 1) in which the elastic mechanism 400 is accommodated, as illustrated in FIG. 1, to correspond to the regions I to IV respectively. Each accommodating region extends in a substantially straight line or in a substantially arc shape along the circumferential direction of the disk plate 200 in order to accommodate an elastic body 410 which extends along the circumferential direction of the disk plate 200. In addition, the regions I to IV refer to four regions each having a substantially 90-degree sector shape as illustrated in FIG. 1 when the damper device 1 is viewed from above.

More specifically, referring to FIG. 1, the first plate 201 and the second plate 202 define a first accommodating region 203a, a second accommodating region 203b, a third accommodating region 203c, and a fourth accommodating region 203d which extend in the circumferential direction to correspond to the regions I to IV respectively. In addition, in the hub 300 to be described later, window holes 301a, 301b, 301c and 301d are formed so as to correspond to the first accommodating region 203a, the second accommodating region 203b, the third accommodating region 203c, and the fourth accommodating region 203d.

When focusing on the region IV, as illustrated in FIGS. 1 to 3, the first plate 201 and the second plate 202 include, as a sidewall surrounding the fourth accommodating region 203d, one end surface (fourth one end surface) $204d_1$ and a remaining end surface (fourth remaining end surface) $204d_2$ facing to the fourth one end surface. As an example, the fourth one end surface $204d_1$ and the fourth remaining end surface $204d_2$ extend along the axial direction of the disk plate 200.

Similarly, when focusing on the region I, the first plate 201 and the second plate 202 include, as a sidewall surrounding the first accommodating region 203a, one end surface (first one end surface) $204a_1$ and a remaining end surface (first remaining end surface) $204a_2$ facing to the first one end surface. When focusing on the region II, the first plate 201 and the second plate 202 include, as a sidewall surrounding the second accommodating region 203b, one end surface (second one end surface) $204b_1$ and a remaining end surface (second remaining end surface) $204b_2$ facing to the second one end surface, and when focusing on the region III, the first plate 201 and the second plate 202 include, as a sidewall surrounding the third accommodating region 203c, one end surface (third one end surface) $204c_1$ and a remaining end surface (third remaining end surface) $204c_2$ facing to the third one end surface.

In addition, as illustrated in FIG. 2, a gap G is formed in the axial direction between the first plate 201 and the second plate 202 to allow the hub 300 to be described later to be introduced thereinto, i.e., to allow movement (relative rotation) of the hub 300 in the circumferential direction. The gap G is also similarly formed in the regions I to III.

Meanwhile, in each of the regions I to IV in the first plate 201, a notch 205 is formed to allow movement (relative rotation) of the hub 300 to be described later in the circumferential direction. Further, the outer edge of the notch 205 functions as a restricting portion 210 that restricts relative rotation of the hub 300 beyond a predetermined torsion angle.

As illustrated in FIGS. 4 and 5, the restricting portion 210 may be provided radially inward of the rivet 250 which integrates the first plate 201 and the second plate 202. With this configuration, the stopper torque generated in the rivet 250 may be efficiently reduced. Although the shape of the restricting portion 210 is not particularly limited, for example, as illustrated in FIGS. 2 to 4, when the first plate 201 has a radially outer first portion 201a and a radially inner second portion 201b, the restricting portion 210 may also be regarded as extending not only in the radial direction but also in the axial direction (direction parallel to the rotation shaft X) in response to the fact that the first portion 201a and the second portion 201b are disposed to be shifted in the axial direction.

The restricting portion 210 may be formed by performing bending (a processing to generate a step) on the first plate 201 as one sheet of plate material in the axial direction. A side surface portion of the step created as a result of the processing may be used as the restricting portion 210. In addition, between the respective restricting portions 210 disposed in the respective regions I to IV, as illustrated in FIGS. 2 and 3, a rib 211 for supplementing the strength of the restriction portion 210 is provided on the first plate 201 so as to extend in the circumferential direction and support the restricting portion 210.

1-3. Hub 300

The hub 300 as a third rotating body functions as an output member in the damper device 1, and is formed of, for example, a metal material. The hub 300 has a substantially annular shape as a whole, and is sandwiched between the first plate 201 and the second plate 202 (in the gap G) so as to be rotatable around the rotation shaft X relative to the disk plate 200 (the first plate 201 and the second plate 202). Further, as illustrated in FIGS. 1 to 5 (particularly as illustrated in FIG. 4), the hub 300 may be spline-coupled to an input shaft 500 of the transmission by allowing the input shaft 500 to be inserted through a through-hole 303 formed in a substantially cylindrical cylinder portion 302 thereof. Further, the hub 300 is provided with a disc portion 305 having an outer diameter from the cylinder portion 302 to the radial outer side.

In the disc portion 305, as described above, the window holes 301a, 301b, 301c and 301d are equidistantly formed to correspond to the first accommodating region 203a, the second accommodating region 203b, the third accommodating region 203c, and the fourth accommodating region 203d. These window holes 301a, 301b, 301c and 301d in the hub 300 are formed to correspond to a configuration of the elastic mechanism 400 to be described later, more specifically, the number of elastic bodies 410. That is, the elastic mechanism 400 to be described later is accommodated in each of the window holes 301a, 301b, 301c and 301d.

Protrusions 306a, 306b, 306c and 306d are formed on the radial end of the disc portion 305 to correspond to the regions I to IV. Each of the protrusions 306a, 306b, 306c and 306d is accommodated in the notch 205 provided in the first plate 201 so that the hub 300 may rotate relative to the disk plate 200. Further, when the hub 300 performs relative rotation by a predetermined torsion angle, each of the protrusion 306a, 306b, 306c or 306d abuts on the restricting portion 210 on the first plate 201 which is also the outer edge of the notch 205, and functions to restrict the relative rotation of the hub 300 beyond the torsion angle.

1-4. Elastic Mechanism 400

As illustrated in FIGS. 1 to 3, the first elastic mechanism 400 is mainly constituted of the elastic body 410 which mainly uses a coil spring and a pair of sheet members 420 (a first sheet member 420x and a second sheet member 420y) which support the elastic body 410 in each of the regions I to IV. In addition, although FIGS. 1 to 3 illustrate an example in which one coil spring is used, this disclosure is not limited thereto. For example, two coil springs may be arranged in series.

Then, in the embodiment illustrated in FIGS. 1 to 3, as an example, four accommodating regions, i.e., the first accommodating region 203a, the second accommodating region 203b, the third accommodating region 203c, and the fourth accommodating region 203d are formed in the disk plate 200 (and the window holes 301a, 301b, 301c and 301d are formed in the hub 300 to correspond to the accommodating regions as described above), so that one elastic body 410 is accommodated in each of the four accommodating regions, i.e., to correspond to each of the regions I to IV. Further, in each of the regions I to IV, both ends of the elastic body 410 are supported by the pair of sheet members 420 (the first sheet member 420x and the second sheet member 420y) in each accommodation region.

Here, when focusing on the region I, one of the sheet members 420 (the first sheet member 420x) supporting the elastic body 410 is engaged with each of the first one end surface $204a_1$ provided on the disk plate 200 and a first engaging portion (not illustrated) provided on the hub 300. Further, the other one of the sheet members 420 (the second sheet member 420y) supporting the elastic body 410 is engaged with each of the first remaining end surface $204a_2$ provided on the disk plate 200 and a second engaging portion (not illustrated) provided on the hub 300. In addition, the above configuration described for the region I is the same for the regions II to IV.

With the above configuration, the elastic body 410 may elastically interconnect the disk plate 200 and the hub 300 in the rotation direction with the sheet members 420 interposed therebetween. That is, when the disk plate 200 and the hub 300 rotate relative to each other in a state where the power from the drive source such as an engine or a motor is transmitted in the order of the disk plate 200, the first sheet member 420x, the elastic body 410, the second sheet member 420y, and the hub 300 (under the assumption that positive power is transmitted in the clockwise direction), the elastic body 410 is compressively deformed to absorb torque fluctuation. In this way, the elastic mechanism 400 including the elastic body 410 may be regarded as having a main damper function in the damper device 1.

2. OPERATION OF DAMPER DEVICE

Next, an operation of the damper device 1 having the above configuration will be described with reference to FIGS. 2 and 3.

First, the damper device 1 illustrated in FIG. 2 is in a state where no relative rotation occurs between the disk plate 200 and the hub 300, although the power from the drive source such as an engine or a motor is transmitted to the damper device 1.

As described above, the power from the drive source such as an engine or a motor is transmitted in the order of the first rotating body 100, the disk plate 200, the first sheet member 420x, the elastic body 410, the second sheet member 420y, and the hub 300. When this is focused with respect to the region I, the power is transmitted from the first one end surface $204a_1$ provided on the disk plate 200 to the first sheet member 420x and in turn, the first sheet member 420x transmits the power to the second sheet member 420y while causing the elastic body 410 to bend. Furthermore, the second sheet member 420y transmits the power to the hub 300, thus causing the power to be finally output to the input shaft 500 of the transmission. In addition, when negative power is transmitted in the counterclockwise direction, the power is transmitted from the first remaining end surface $204a_2$ of the disk plate 200 to the second sheet member 420Y and in turn, the second sheet member 420y transmits the power to the first sheet member 420x while causing the elastic body 410 to bend. Furthermore, the first sheet member 420x transmits the power to the hub 300. This power transmission is the same for the regions II to IV.

In such a power transmission path, the hub 300 rotates relative to the disk plate 200. More specifically, the hub 300 rotates relative to the disk plate 200 in the same rotation direction as the power transmission (clockwise direction in the first embodiment) based on the rotational phase difference with the disk plate 200. In this case, the restricting portion 210 is provided as described above so that the hub 300 does not rotate excessively relative to the disk plate 200. In addition, FIG. 3 illustrates a state where the protrusion (protrusion 306c) abuts on the restricting portion 210 to restrict the excessive relative rotation of the hub 300. In addition, in a case where the excessive relative rotation of the hub 300 is restricted, when the aforementioned torque fluctuation may not be absorbed, the limiter constituted by the support plate 102 constituting the first rotating body 100, the pressure plate 5, and the disc spring 6 is configured to generate a slip (interrupt the power transmission from the cover plate 101 in the first rotating body 100 to the second rotating body 200).

3. MODIFICATION

Figure 6:
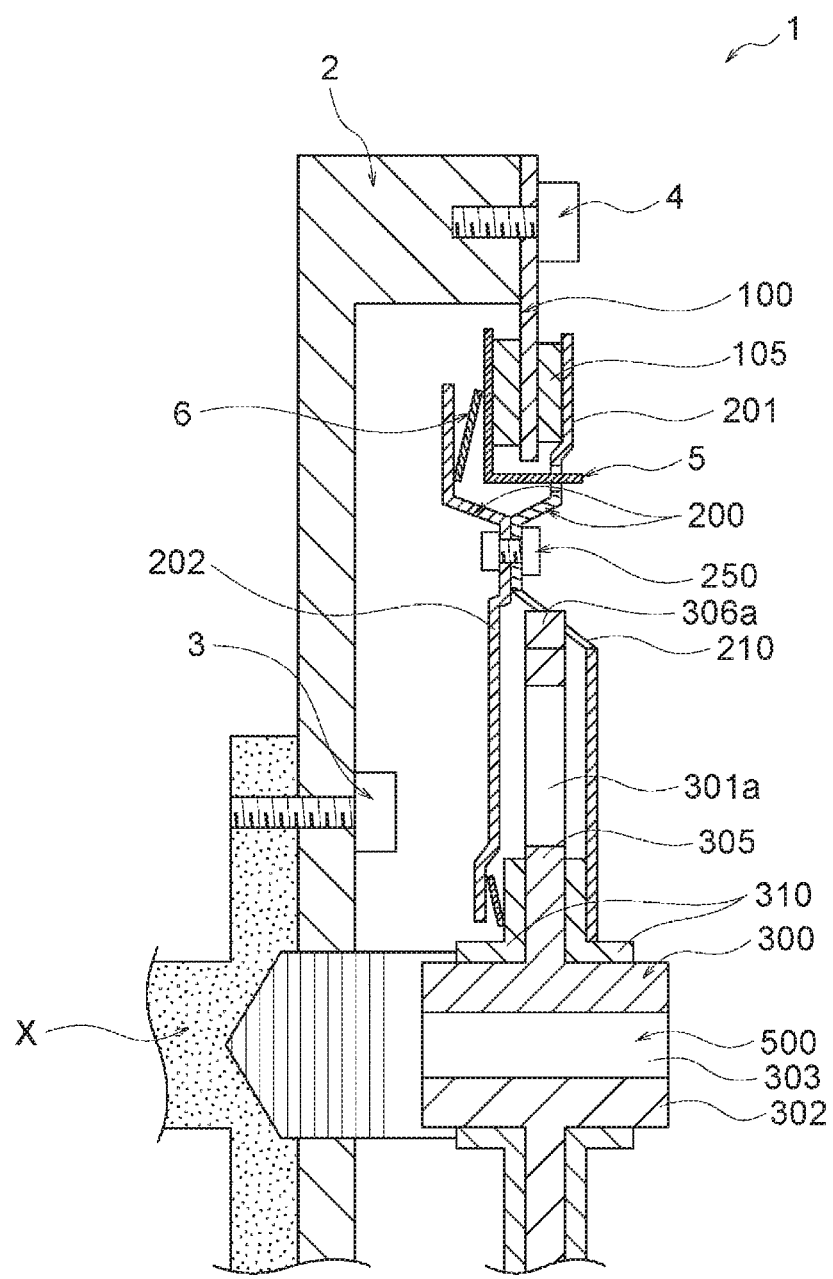
FIG. 6 is a schematic cross-sectional view schematically illustrating a configuration of a damper device according to a second embodiment.
Figure 7:
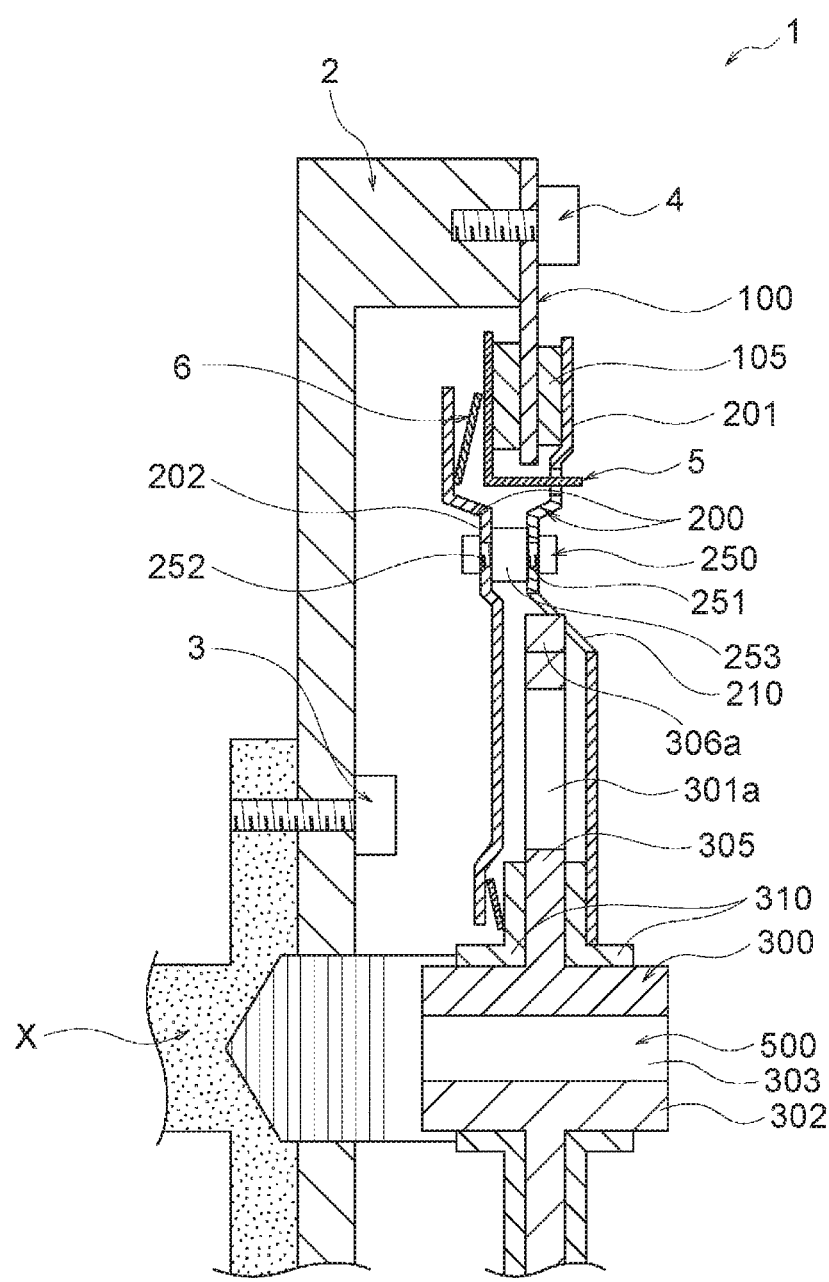
FIG. 7 is a schematic cross-sectional view schematically illustrating a configuration of a damper device according to a third embodiment.
Figure 8:
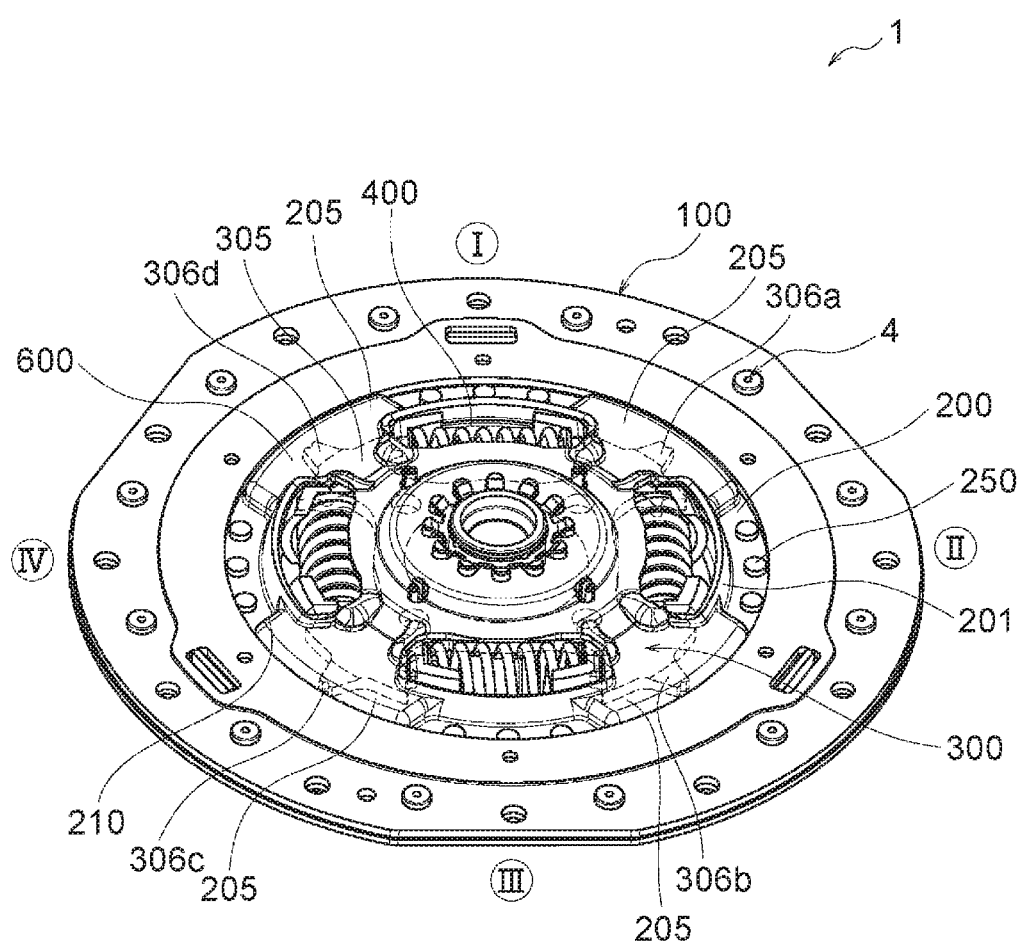
FIG. 8 is a schematic perspective view schematically illustrating a configuration of a damper device according to a fourth embodiment.
Figure 9:
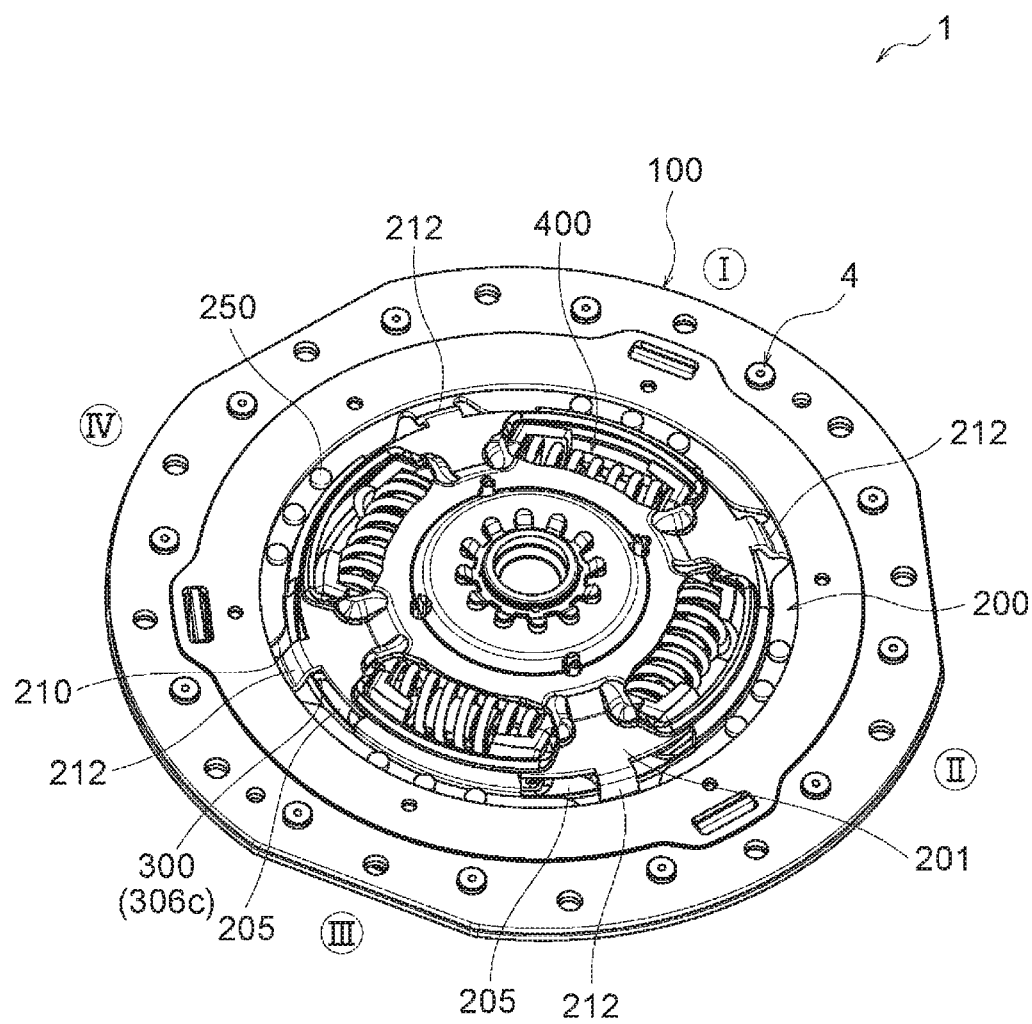
FIG. 9 is a schematic perspective view schematically illustrating a configuration of a damper device according to a fifth embodiment.
Figure 10:
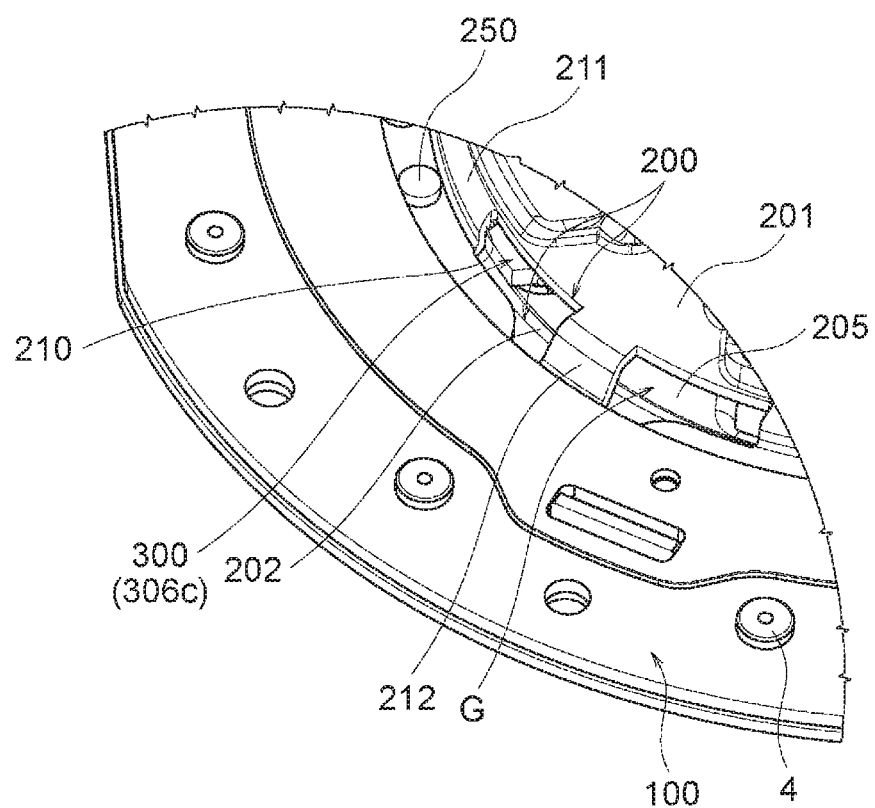
FIG. 10 is a schematic perspective view illustrating a state where a hub rotates relative to a disk plate by a predetermined torsion angle in the damper device according to the fifth embodiment.
Figure 11:
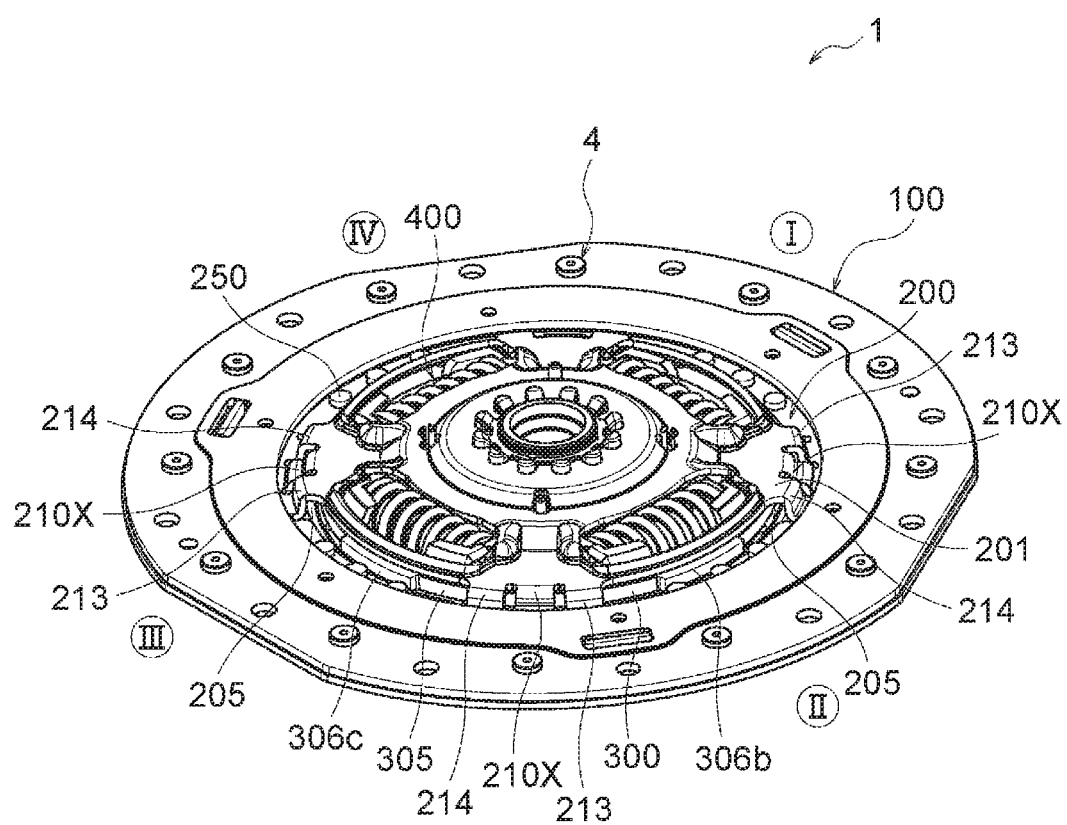
FIG. 11 is a schematic perspective view schematically illustrating a configuration of a damper device according to a sixth embodiment.
Figure 12:
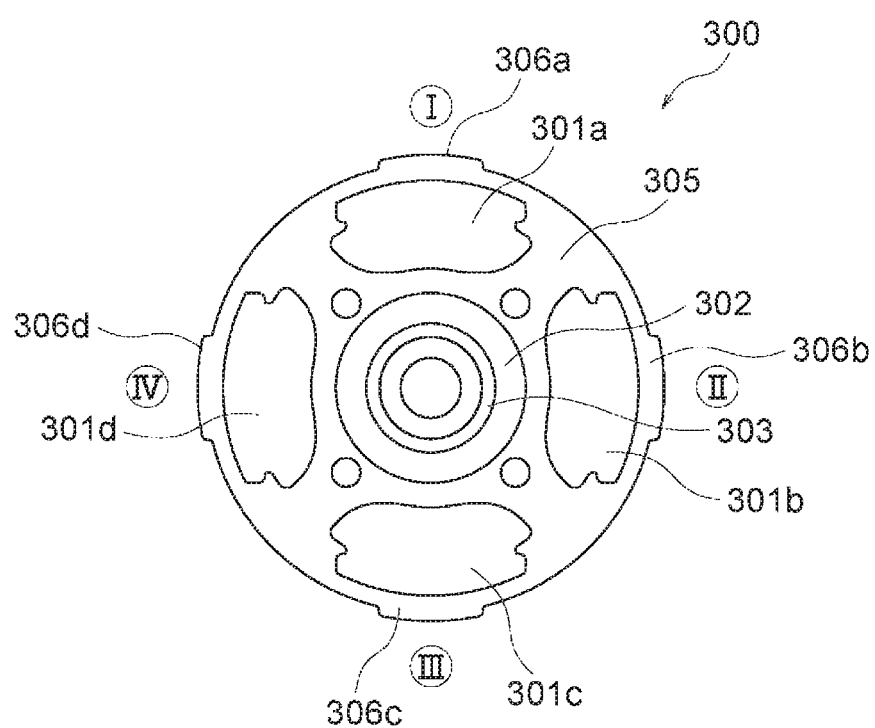
FIG. 12 is a schematic top view schematically illustrating a hub incorporated in the damper device according to the sixth embodiment.
Figure 13:
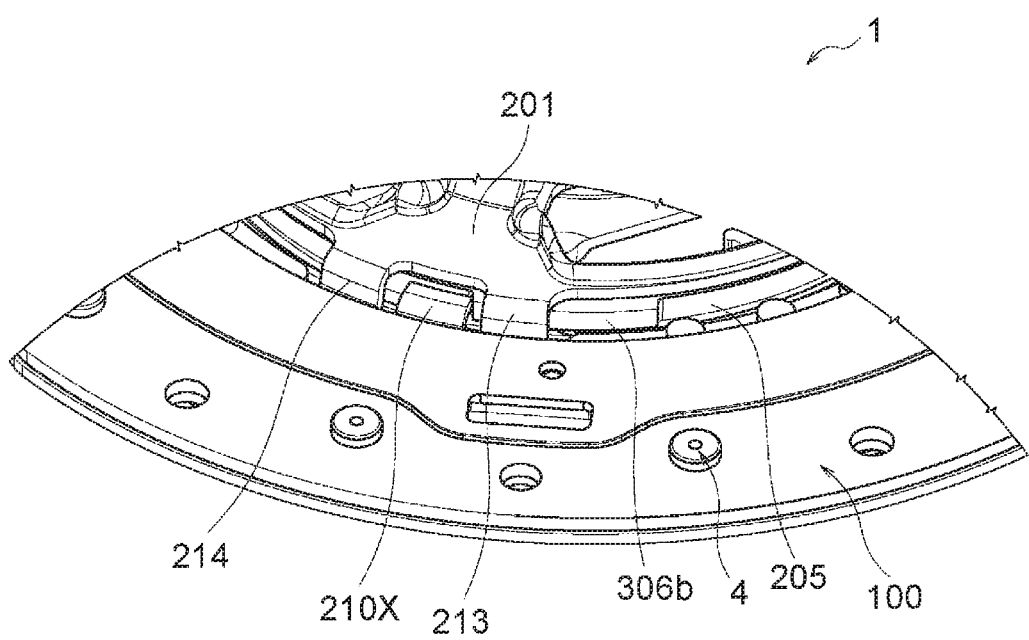
FIG. 13 is a schematic perspective view illustrating a state where a hub rotates relative to a disk plate by a predetermined torsion angle in the damper device according to the sixth embodiment.
Figure 14:
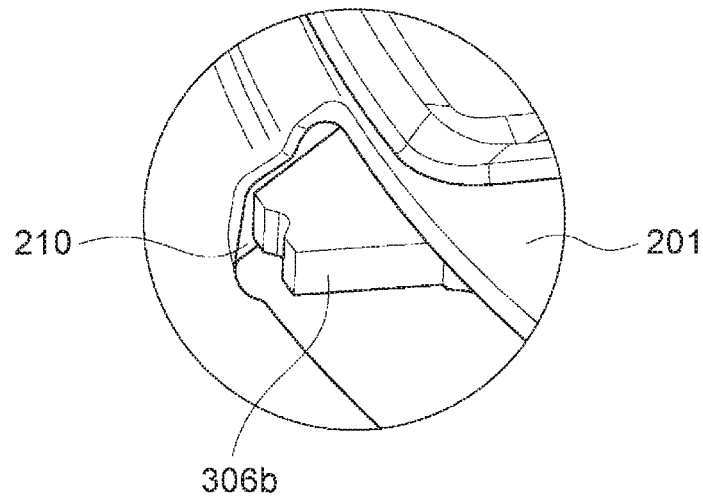
FIG. 14 is a schematic perspective view schematically illustrating a part of a configuration of a damper device according to a seventh embodiment in an enlarged manner.

Next, a configuration of the damper device 1 according to other embodiments will be described with reference to FIGS. 6 to 14. FIG. 6 is a schematic cross-sectional view schematically illustrating a configuration of the damper device 1 according to a second embodiment. FIG. 7 is a schematic cross-sectional view schematically illustrating a configuration of the damper device 1 according to a third embodiment. FIG. 8 is a schematic perspective view schematically illustrating a configuration of the damper device 1 according to a fourth embodiment. FIG. 9 is a schematic perspective view schematically illustrating a configuration of the damper device 1 according to a fifth embodiment. FIG. 10 is a schematic perspective view illustrating a state where the hub 300 rotates relative to the disk plate 200 by a predetermined torsion angle in the damper device 1 according to the fifth embodiment. FIG. 11 is a schematic perspective view schematically illustrating a configuration of the damper device 1 according to a sixth embodiment. FIG. 12 is a schematic top view schematically illustrating the hub 300 incorporated in the damper device 1 according to the sixth embodiment. FIG. 13 is a schematic perspective view illustrating a state where the hub 300 rotates relative to the disk plate 200 by a predetermined torsion angle in the damper device 1 according to the sixth embodiment. FIG. 14 is a schematic perspective view schematically illustrating a part of a configuration of the damper device 1 according to a seventh embodiment in an enlarged manner.

3-1. Second Embodiment

The damper device 1 according to a second embodiment has substantially the same configuration as the damper device 1 according to the above-described first embodiment, but a configuration of the first rotating body 100 and a configuration of the power transmission from the first rotating body 100 to the disk plate 200 (first plate 201) are different from the first embodiment. In addition, in the damper device 1 according to the second embodiment, a detailed description of the same configuration as the damper device 1 according to the first embodiment will be omitted.

The first rotating body 100 of the damper device 1 according to the above-described first embodiment is constituted of the cover plate 101 and the support plate 102, whereas the first rotating body 100 of the damper device 1 according to the second embodiment is constituted of only one sheet of plate material (lining plate 100). The lining plate 100 is secured to the flywheel 2 by the bolt 4, and transmits the power to the disk plate 200 (first plate 201) via the friction material 105 provided between the lining plate 100 and the first plate 201 in the disk plate 200.

In addition, similarly to the case of the above-described first embodiment, as an alternative to providing the friction material 105 described above, a first coating layer (not illustrated) which is made of a compound containing a 3d transition metal may be formed on at least one of the surface of the lining plate 100 facing the disk plate 200 and the surface of the lining plate 100 facing the pressure plate 5, and a second coating layer (not illustrated) which is made of a compound containing a 3d transition metal and has a lower hardness than that of the first coating layer may be formed on at least one of the surface of the first plate 201 facing the lining plate 100 and the surface of the pressure plate 5 facing the lining plate 100. Thus, the efficiency of power transmission may be improved.

In addition, the pressure plate 5 is provided at a position facing the lining plate 100 on the opposite side of the first plate 201 in the axial direction. The pressure plate 5 is positioned to be sandwiched between the lining plate 100 and the second plate 202, and one end thereof is secured to the first plate 201. Further, the pressure plate 5 is pressed toward the first plate 201 by the disc spring 6. With this configuration, the pressure plate 5 and the lining plate 100 rotate substantially integrally to transmit the power from the flywheel 2 to the disk plate 200 (the first plate 201).

In the damper device 1 according to the second embodiment, the number of components of the first rotating body 100 may be reduced as compared with the first embodiment.

3-2. Third Embodiment

Next, the damper device 1 according to a third embodiment is substantially the same as the above-described damper device 1 according to the second embodiment in most of the components, but, in the damper device 1 according to the third embodiment, as illustrated in FIG. 7, the rivet 250 is configured to have a large outer diameter near the center thereof and a small outer diameter at the ends thereof. That is, the rivet 250 of the damper device 1 according to the third embodiment includes a first fastening portion 251 which guides the first plate 201 in the radial direction and a second fastening portion 252 which guides the second plate 202 in the radial direction, and the first fastening portion 251 and the second fastening portion 252 are set at the above-described location where the outer diameter of the rivet is small. A large-diameter portion 253 having a large outer diameter is formed between the two fastening portions.

By using such a rivet 250, the first plate 201 and the second plate 202 in the disk plate 200 may be spaced apart from each other. Thus, when the first plate 201 and the second plate 202 are fastened with the rivet 250, the depth of a step formed by performing an axial step processing on the first plate 201 (and the second plate 202) at a position corresponding to the fastening position may be reduced, so that the formability of the first plate 201 (and the second plate 202) is improved and the strength of the first plate 201 (and the second plate 202) is improved.

3-3. Fourth Embodiment

Next, the damper device 1 according to the fourth embodiment is substantially the same as the above-described damper device 1 according to the first, second, and third embodiments in most of the components, but, in the damper device 1 according to the fourth embodiment, as illustrated in FIG. 8, an enclosing portion 600 is formed to enclose the notch 205 provided in the first plate 201 and to accommodate the hub 300 therein. The enclosing portion 600 may be formed by bending the first plate 201 (and the second plate 202). In this way, by providing the enclosing portion 600, the strength of the first plate 201 and the hub 300 may be improved.

3-4. Fifth Embodiment

Next, the damper device 1 according to a fifth embodiment is substantially the same as the above-described damper device 1 according to the first embodiment, but, as illustrated in FIGS. 9 and 10, is provided near approximately the center of the notch 205 provided in the first plate 201 with an auxiliary rib 212 which is continuously provided in the radial direction from the first plate 201. By forming the auxiliary rib 212, the strength of the restricting portion 210 of the first plate 201 on which the hub 300 repeatedly abuts (collides) and thus, the strength of the first plate 201 itself may be improved.

3-5. Sixth Embodiment

Next, the damper device 1 according to the sixth embodiment has substantially the same configuration as the damper device 1 according to the first embodiment or the damper device 1 according to the fifth embodiment, but, as illustrated in FIGS. 11 to 13, the shape of the hub 300 and the shape of the restricting portion 210 provided on the first plate 201 are different from those of the other embodiments.

Specifically, the protrusions 306a, 306b, 306c, and 306d of the hub 300 are shaped to extend long in the circumferential direction. Correspondingly, the notches 205 which accommodate the protrusions 306a, 306b, 306c and 306d are provided in the first plate 201 so as to extend longer in the circumferential direction than in the case of the damper device 1 according to the first embodiment. That is, the notch 205 is formed in each region to extend long in the circumferential direction to correspond to the regions I to IV. Then, the first plate 201 is provided with a partition 210x to separate the notches 205 provided in the respective neighboring regions from each other, and the circumferential end surface of the partition 210x functions as the restricting portion 210. In addition, the partition 210x is formed on the first plate 201 so as to extend in the radial direction to correspond to the respective regions I to IV. The partition 210x may be provided by processing the first plate 201. Alternatively, the partition 210x as a separate body may be secured to the first plate 201.

Further, the first plate 201 is provided with a pair of reinforcing ribs 213 and 214 to support the partition 210x so that the partition 210x is sandwiched between the reinforcing ribs 213 and 214 in the circumferential direction. The pair of reinforcing ribs 213 and 214 are also formed on the first plate 201 to extend in the radial direction to correspond to the respective regions I to IV, similarly to the partition 210x. With this configuration, the strength of the partition 210x (the restricting portion 210) may be improved.

3-6. Seventh Embodiment

Next, the damper device 1 according to the seventh embodiment has substantially the same configuration as the damper device 1 according to the first embodiment, but, as illustrated in FIG. 14, the restricting portion 210 is shaped by bending the outer edge of the notch 205 in the axial direction. For this reason, the strength of the restricting portion 210 and thus, the first plate 201 is improved.

As described above, various embodiments have been described as examples, but the above embodiments are merely examples, and are not intended to limit the scope of this disclosure. The above embodiments may be implemented in various other forms, and various omissions, substitutions, and changes may be made without departing from the scope of the disclosure. Further, each configuration, shape, size, length, width, thickness, height, number, and the like may be changed and implemented as appropriate. Further, the various embodiments described above may also be applied to a damper device for an application that does not require the above-described limiter function such as, for example, a clutch disk.

A damper device according to an aspect of this disclosure includes a first rotating body configured to rotate around a rotation shaft and receive power transmitted from a flywheel, a second rotating body including at least a first plate configured to receive the power transmitted from the first rotating body and rotate around the rotation shaft and a second plate disposed to face the first plate and configured to rotate integrally with the first plate around the rotation shaft, a third rotating body configured to rotate relative to the second rotating body around the rotation shaft, a fastening body configured to integrate the first plate and the second plate at a position radially spaced apart from a position where the power is transmitted from the first rotating body to the first plate, and an elastic mechanism configured to elastically interconnect the second rotating body and the third rotating body in a rotation direction, and the first plate is provided with a restricting portion that restricts relative rotation of the third rotating body beyond a predetermined torsion angle.

According to the damper device having this configuration, since the power transmission from the first rotating body to the second rotating body is performed without interposing the fastening body, the shear stress generated in the fastening body may be reduced.

In the damper device according to the aspect, it is preferable that the restricting portion is provided radially inward of the fastening body.

According to this configuration, the damper device capable of reducing the stopper torque generated in the fastening body may be provided.

In the damper device according to the aspect, it is preferable that the first plate is provided with a rib that extends in a circumferential direction and supports the restricting portion.

According to this configuration, the strength of the restricting portion may be improved.

In the damper device according to the aspect, it is preferable that the first plate is provided with a partition extending in a radial direction and a pair of reinforcing ribs extending in the radial direction to support the partition interposed therebetween in a circumferential direction, and the restricting portion is a circumferential end surface of the partition.

According to this configuration, the strength of the restricting portion may be improved.

In the damper device according to the aspect, it is preferable that the fastening body includes a first fastening portion that guides the first plate in the radial direction and a second fastening portion that guides the second plate in the radial direction, and the first fastening portion and the second fastening portion are spaced apart from each other in an axial direction.

According to this configuration, when the first plate and the second plate are fastened with the fastening body, the depth of a step formed by performing drawing, i.e., an axial step processing on the first plate (and the second plate) at a position corresponding to the fastening position may be reduced, so that the formability of the first plate (and the second plate) is improved and the strength of the first plate (and the second plate) is improved.

According to various embodiments, it is possible to provide a damper device which reduces the shear stress and stopper torque generated in a rivet.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. A damper device comprising:
a first rotating body configured to rotate around a rotation shaft and receive power transmitted from a flywheel;
a second rotating body including at least 1) a first plate configured to receive the power transmitted from the first rotating body at a radially outward portion of the first plate and 2) a second plate disposed to face the first plate and configured to rotate integrally with the first plate around the rotation shaft;
a third rotating body configured to rotate relative to the second rotating body around the rotation shaft;
a fastening body configured to integrate the first plate and the second plate at a position radially spaced apart from the radially outward portion of the first plate, the fastening body being separate from the first plate; and
an elastic mechanism configured to elastically interconnect the second rotating body and the third rotating body in a rotation direction, wherein
the first plate, including the radially outward portion and a restricting portion that restricts relative rotation of the third rotating body beyond a predetermined torsion angle, is a single piece.

2. The damper device according to claim 1, wherein the restricting portion is provided radially inward of the fastening body.

3. The damper device according to claim 1, wherein the first plate is provided with a rib that extends in a circumferential direction and supports the restricting portion.

4. The damper device according to claim 1, wherein the first plate is provided with a partition extending in a radial direction and a pair of reinforcing ribs extending in the radial direction to support the partition interposed therebetween in a circumferential direction, and the restricting portion is a circumferential end surface of the partition.

5. The damper device according to claim 1, wherein the fastening body includes a first fastening portion that guides the first plate in a radial direction and a second fastening portion that guides the second plate in the radial direction, and the first fastening portion and the second fastening portion are spaced apart from each other in an axial direction.

6. The damper device according to claim 2, wherein the first plate is provided with a rib that extends in a circumferential direction and supports the restricting portion.

7. The damper device according to claim 2, wherein the first plate is provided with a partition extending in a radial direction and a pair of reinforcing ribs extending in the radial direction to support the partition interposed therebetween in a circumferential direction, and the restricting portion is a circumferential end surface of the partition.

8. The damper device according to claim 2, wherein the fastening body includes a first fastening portion that guides the first plate in a radial direction and a second fastening portion that guides the second plate in the radial direction, and the first fastening portion and the second fastening portion are spaced apart from each other in an axial direction.

9. The damper device according to claim 3, wherein the fastening body includes a first fastening portion that guides the first plate in a radial direction and a second fastening portion that guides the second plate in the radial direction, and the first fastening portion and the second fastening portion are spaced apart from each other in an axial direction.

10. The damper device according to claim 4, wherein the fastening body includes a first fastening portion that guides the first plate in the radial direction and a second fastening portion that guides the second plate in the radial direction, and the first fastening portion and the second fastening portion are spaced apart from each other in an axial direction.

11. The damper device according to claim 6, wherein the fastening body includes a first fastening portion that guides the first plate in a radial direction and a second fastening portion that guides the second plate in the radial direction, and the first fastening portion and the second fastening portion are spaced apart from each other in an axial direction.

12. The damper device according to claim 7, wherein the fastening body includes a first fastening portion that guides the first plate in the radial direction and a second fastening portion that guides the second plate in the radial direction, and the first fastening portion and the second fastening portion are spaced apart from each other in an axial direction.

13. The damper device according to claim 1, wherein the restricting portion comprises an outer edge of a notch formed in the first plate.

* * * * *